Nov. 1, 1938.  W. W. CANNON  2,135,168
LIQUID MEASURING DISPENSING VALVE
Filed Jan. 17, 1938  2 Sheets-Sheet 2
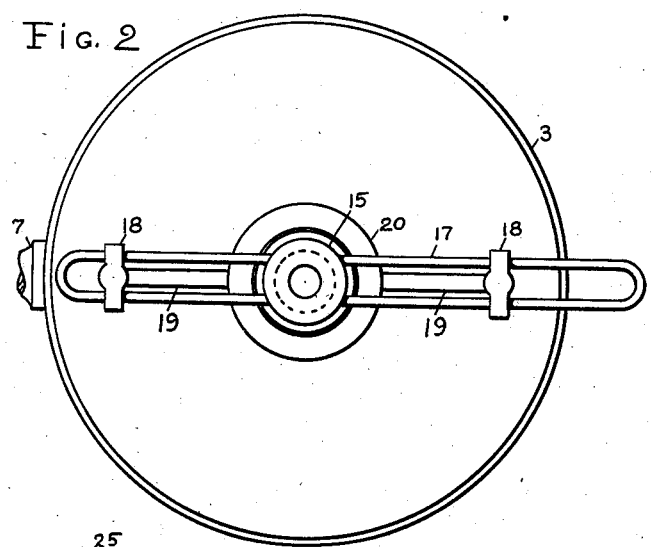
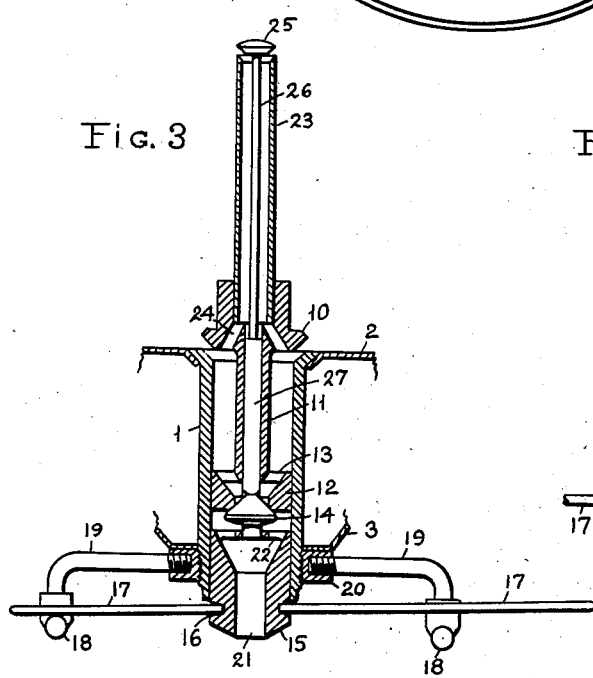
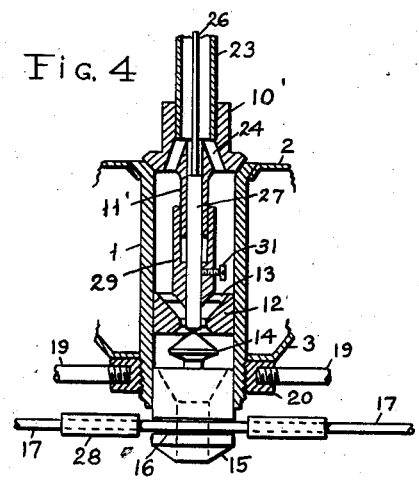
WILLIAM W. CANNON
INVENTOR.
BY *John P. Nikonow*
ATTORNEY.

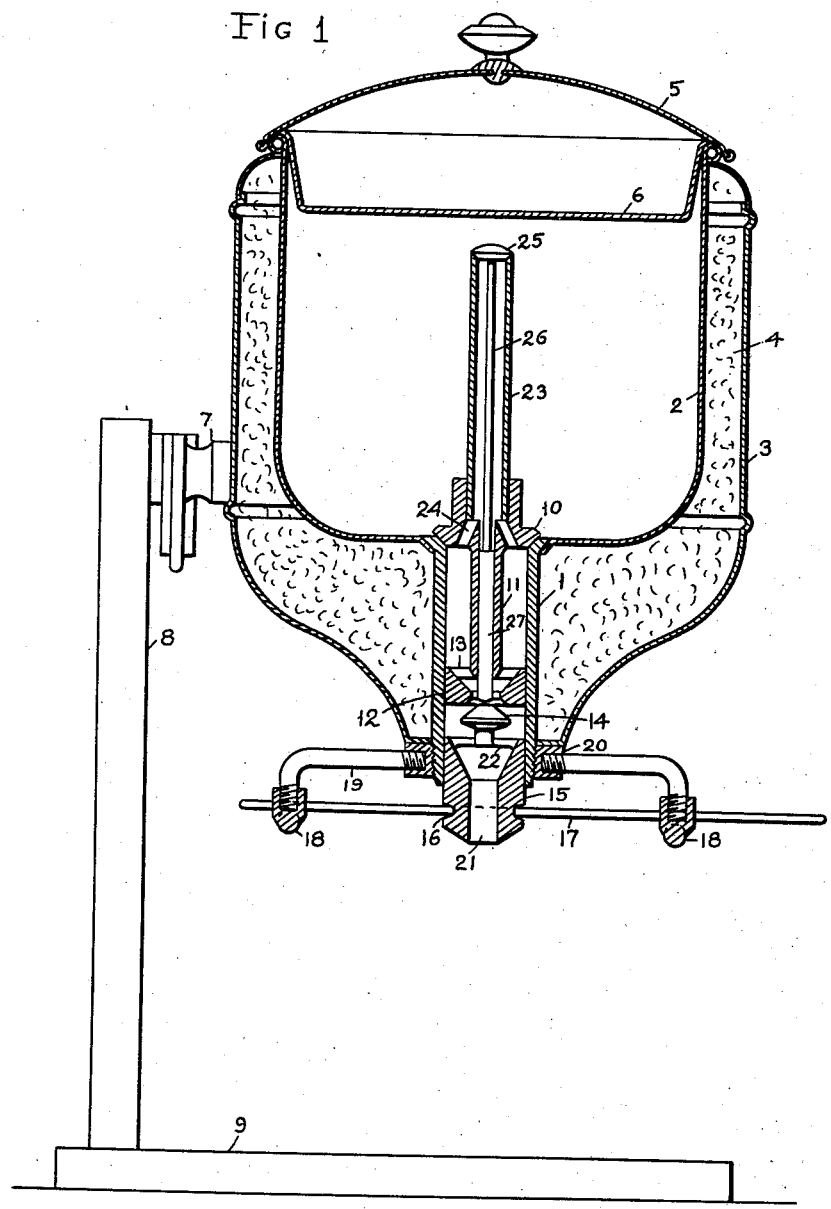

Patented Nov. 1, 1938

2,135,168

UNITED STATES PATENT OFFICE 2,135,168

LIQUID MEASURING DISPENSING VALVE

William W. Cannon, New York, N. Y., assignor to Alpha Products Company, New York, N. Y.

Application January 17, 1938, Serial No. 185,390

15 Claims. (Cl. 221—114)

My invention relates to beverage dispensing and measuring valves and has particular reference to valves used in connection with containers for beverages which are dispensed in accurately measured quantities or portions.

My invention has for its object to provide a valve which can be manually operated so as to deliver measured quantities of a beverage such as cream from a container. For this purpose I provide a tubular casing extending vertically downward from the bottom of a container and having a valve on top for admitting a liquid from the container into the casing. The casing has another valve at the bottom so arranged that it can be opened only when the top valve is closed and the top valve can be opened only when the bottom valve is closed. I also provide the casing with a manually operable lever connected with the bottom valve for opening or closing the same, the corresponding movements being also transmitted to the upper valve for its respective closing or opening. The liquid is therefore admitted into the casing when the lever is raised, and is then cut off from the container to be subsequently discharged from the casing into a cup or other suitable receptacle placed under the casing.

Another object of my invention is to provide means for loosely supporting the manually operable lever under the casing in such manner that it can be raised either by lifting its end or by the pressure from underneath on its portions at the sides of the casing, as, for instance, by pressing on it upwardly by the rim of a cup or glass. I also provide a spout in the lower valve for dispensing the liquid, the spout being of such a shape that it can be raised by a narrow necked receptacle for filling the same with the liquid.

Another object of my invention is to provide a vent tube extending from the casing to the upper portion of the container above the normal level of the liquid therein in order to facilitate filling of the casing with the liquid by providing escape for the air in the casing.

Another object of my invention is to provide means to prevent dripping of the liquid from the casing after it has been emptied from the main body of the liquid. For this purpose I provide a valve in the vent tube so connected with the bottom casing valve that the vent valve is closed when the bottom valve is opened thereby shutting off the escape of air from the casing and thereby stopping any dripping through the bottom valve opening.

Another object of my invention is to provide means for rapid emptying of the container when desired or necessary. For this purpose I arrange the upper valve so that it can be raised and thereby opened by manually raising the vent tube, the bottom valve remaining open. With both valves thus opened the liquid is free to flow through the casing.

Still another object of my invention is to arrange the valve parts so that they can be easily removed from the casing for washing and cleaning, leaving the casing open from both ends also for cleaning and washing.

My invention is more fully described in the accompanying specification and drawings in which—

Fig. 1 is a sectional elevation of a container with my dispensing and measuring valve.

Fig. 2 is a bottom plan view of the container.

Fig. 3 is a fractional sectional view of my valve in the position for admitting a liquid from the container into the valve casing.

Fig. 4 is a fractional sectional view of a modified valve.

My valve consists of a tubular casing 1 extending vertically downward from the bottom plate of a container 2 for cream or other beverage or liquid. The lower end of the casing 1 is supported in the lower portion of an outer shell 3, the space between the container and shell being filled with a heat insulating material 4 such as rock wool, asbestos, etc. The container 2 is closed on top with a cover 5, a tray 6 for ice or similar cooling medium being supported under the cover 5. The container has a bracket 7 at the side supported on a standard 8 extending from a base 9 for receptacles such as cups, glasses, bottles, etc. The upper end of the casing 1 has a valve seat for a valve 10. A tubular rod 11 extends downward from the valve 10 and has a plunger 12 at the lower end slidably fitted in the casing 1. The plunger has a central opening 13 with a valve seat underneath which can be closed by a valve 14 extending from a hollow plunger 15. The lower end of the valve plunger 15 extends outside the casing 1 and has an annular groove 16 engaged by a lever 17. The latter extends in either direction from the member 15 and rests on T-shaped members 18 rotatively supported on the ends of a yoke 19. In the embodiment shown in Fig. 1 the lever is formed of two rods connected at the ends and spaced apart so as to form slots slidably fitted over the central portions of the T-shaped members and ends of the yoke, the T-members being threaded on the ends of the yoke so that they can be turned sidewise when it is desired to remove the lever with the plunger member 15. The yoke has a central portion 20 screwed on the threaded end of the casing and resting against the lower end of the outer shell 3.

The lower end of the bottom valve plunger 15 forms a spout with a central opening 21 extending through the plunger 15 for pouring a liquid therethrough, the valve 14 being supported on a bridge 22.

A tube 23 is fitted in the valve 10 and extends up to the top of the container 2 above the normal level of the liquid and is in communication with the space in the casing through ducts or channels 24. A valve 25 closes the upper end of the tube 23 and has a rod 26 extending into the tubular rod 11 where it is of a larger diameter and is slidably fitted in the bore of the rod 11. The lower end of the enlarged end 27 of the rod 26 is terminated at a short distance from the valve 14 when the latter is in its open or lowered position.

The operation of my valve is as follows.

The container 2 is filled with a beverage such as cream up to a point below the valve 25. The valve 10 is normally closed and the valve 14 open, no liquid being admitted into the casing. When it is desired to deliver a measured quantity of the liquid, the lever 17 is raised by pushing its longer end upward by an operator's fingers or by pushing both ends of the lever upward by pressing on them with the rim of a cup or glass which it is desired to fill. These operations can be easily performed since both ends of the lever are free to move upward on the T-shaped end pieces and ends of the yoke 19. The object of such movements is to raise the bottom plunger 15, and this can be also accomplished by placing a bottle or similar receptacle against the spout at the end of the plunger 15 provided the neck of the bottle is smaller than the end of the plunger 15. In any case, a receptacle should be placed on the base 9 whenever the plunger 15 is being raised.

The plunger 15 when raised brings the valve 14 against the seat in the plunger 12 thereby closing the passage 13 and raising the rod 27 with the extension 26 thereby opening the top vent valve 25. With the further upward movement of the member 15, the plunger 12 begins to move upward, raising the valve 10 and thereby admitting the liquid into the casing 1, the bottom valve remaining closed. The liquid fills the casing 1, the air escaping through the vent holes 24, tube 23 and the vent valve 25. The casing 1 is proportioned so that it holds a certain required volume of the liquid between its upper and lower valves.

With the lowering of the plunger 15 the valve 10 slides down by gravity, following the member 15 and keeping the bottom valve closed until the top valve 10 comes to rest against the seat in the upper end of the casing 1. The casing is then closed from the container 2, and with the subsequent movement of the member 15 the valve 14 opens the passage 13, permitting the liquid to flow from the casing 1 into a receptacle under the spout 21. The valve 25 is then closed so that the air in the tube 23 becomes to a certain extent exhausted, preventing dripping from the casing through its bottom valve when the main contents of the casing are discharged through the spout 21.

The contents of the container 2 can be quickly removed by simply raising the valve 10 by hand. This can be conveniently accomplished by pulling the tube 23 upward. The valve 10 being open, the liquid will flow into the casing and will continue downward through the open valve in the plunger 12 into a receptacle underneath. The flow will continue uninterruptedly until the container 2 is emptied or until the valve 10 is again closed.

For cleaning the valve the parts 10 and 13 can be completely withdrawn from the casing 1 through the top, and the valve 14 with the plunger 15 can be also withdrawn through the bottom together with the lever 17 which is released from the T-shaped members 18 by turning the latter sidewise to allow them to pass through the spaces between the rods 17. All the parts can be then separately washed, cleaned or sterilized.

In a modification shown in Fig. 4 the rods 17 are provided with rubber sleeves 28 to be used as buffers for the edges of receptacles pressed against the rods 17 for opening the valve 10'. An arrangement is provided for adjusting the volumetric content of the casing 1 between the valves. For this purpose the upper valve 10' has a short tubular rod 11' telescopically fitted in a tubular rod 29 extending from the plunger 12. A set screw 31 is used for locking the rod 11' in the rod 29 in a desired position so as to obtain the exact displacement of the casing between the valves 10' and 14 when both valves are closed.

I claim as my invention:

1. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, and means to manually close the plunger aperture by the bottom valve and to raise the plunger thereby opening the top valve for filling the casing.

2. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, means to manually close the plunger aperture by the bottom valve and to raise the plunger thereby opening the top valve for filling the casing, and a vent tube extending from the casing to a height above the normal level of the liquid in the container.

3. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, means to manually close the plunger aperture by the bottom valve and to raise the plunger thereby opening the top valve for filling the casing, a vent tube extending from the casing to a height above the normal level of the liquid in the container, a vent valve on top of the tube, and means to open the vent valve by closing the bottom plunger valve.

4. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, means to manually close the plunger aperture by the bottom valve and to raise the plunger thereby opening the top valve for filling the casing, a vent tube extending from the casing to a height above the normal level of the liquid in the container, a vent valve on top of the tube, means to open the vent valve by closing the bottom plunger valve, said means comprising a manually operated plunger and a rod extending from the vent valve in the tube to the bottom of the plunger, the plunger being adapted to be raised by the bottom valve in its closed position thereby opening the upper casing valve for admitting liquid into the casing.

5. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, means to manually close the plunger aperture by the bottom valve and to raise the plunger thereby opening the top valve for filling the casing, and means to adjust the distance between the top valve and the plunger thereby changing the volumetric content of the casing between the top valve and plunger.

6. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing telescopically connected with the valve, the bottom of the plunger having an aperture in communication with the casing, a manually operable valve for closing the plunger aperture, the space in the casing between the upper casing valve and plunger being of a required dispensing volume, and means to manually close the plunger aperture by the bottom valve and to raise the plunger thereby opening the top valve for filling the casing.

7. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger apertures, the space in the casing between the upper casing valve and plunger being of a required dispensing volume, means to manually close the plunger aperture by the bottom valve and to raise the plunger thereby opening the top valve for filling the casing, and means to vary the volumetric content of the casing between the top valve and plunger.

8. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, the space between the upper casing valve and plunger being of a required volume, a valve operating member slidably fitted in the casing under the plunger, and means to manually raise the valve operating member thereby closing the bottom plunger aperture and opening the top casing valve.

9. A measuring valve for a beverage dispensing apparatus, comprising a tubular casing adapted to be vertically fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, and means to manually close the plunger aperture by the bottom valve and to raise the plunger thereby opening the top valve for filling the casing.

10. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, the space between the upper casing valve and plunger being of a required volume, a valve operating member slidably fitted in the casing under the plunger, and an elongated member movably supported under the plunger valve and adapted to be manually moved for raising the valve and the plunger.

11. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, the space between the upper casing valve and plunger being of a required volume, a valve operating member slidably fitted in the casing under the plunger, a yoke extending from the lower end of the casing, and an elongated member movably supported on the yoke engaging the bottom valve operating member and adapted to be manually moved upward for raising the valve operating member and the plunger.

12. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, the space between the upper casing valve and plunger being of a required volume, a valve operating member slidably fitted in the casing under the plunger, a yoke extending from the lower end of the casing, the ends of the yoke extending downward and terminating with enlarged portions, and an elongated member slidably fitted on the yoke resting on the enlarged portions, the middle portion of the elongated member engaging the bottom valve operating member, the elongated member being adapted to be manually raised for closing the bottom valve and raising the plunger thereby opening the top valve.

13. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, a manually operable valve for closing the plunger aperture, the space in the casing between the upper casing valve and plunger being of a required dispensing volume, and means to manually close the plunger aperture by the bottom valve and to raise the plunger thereby opening the top valve for filling the casing, the top valve and the plunger being adapted to be removed through the upper end of the casing, the bottom valve being adapted to be removed through the lower end of the casing.

14. A measuring valve for a beverage dispensing apparatus, comprising a tubular casing adapted to be fitted in the bottom portion of a beverage dispensing container with the upper end of the casing in communication with the container, a valve adapted to close the upper end of the casing, a plunger slidably fitted in the casing connected with the valve, the bottom of the plunger having an aperture in communication with the casing, the space between the upper casing valve and plunger being of a required volume, a valve operating member slidably fitted in the casing under the plunger, a yoke extending from the lower end of the casing, the ends of the yoke extending downward and terminating with enlarged portions, and an elongated member slidably fitted on the yoke removably supported on the enlarged portions, the middle portion of the elongated member engaging the bottom valve operating member, the elongated member being adapted to be manually raised for closing the bottom valve and raising the plunger thereby opening the top valve.

15. A beverage dispensing measuring apparatus, comprising a container, a tubular casing supported at the bottom of the container, a valve seat formed at the top of the casing, a plunger slidably fitted in the lower portion of the casing and provided with an axial aperture, a hollow rod extending from the plunger to the upper portion of the casing, a valve on the rod adapted to close the valve seat from the top, the valve being larger in diameter than the plunger, the latter being thereby adapted to be removed through the top of the casing, a tube extending from the top valve to the upper portion of the container, a vent valve on top of the tube, a rod extending from the vent valve to the plunger, a valve seat formed at the bottom side of the plunger, a valve adapted to close the plunger valve seat from the underneath, and means to manually raise the plunger valve for closing the aperture in the plunger, the plunger being adapted to be raised by the continued upward movement of the plunger valve thereby opening the casing valve on top for admitting a liquid from the container into the casing, the plunger valve when raised being adapted to raise the rod and to open the vent valve, the top valve being adapted to be opened for emptying the container by manually raising the tube thereby raising the top valve and the plunger.

WILLIAM W. CANNON.